Feb. 11, 1958 R. B. TROUSDALE 2,823,266
SUBSCRIBER LINE RINGING IN AN ELECTRONIC TELEPHONE SYSTEM
Filed May 10, 1955
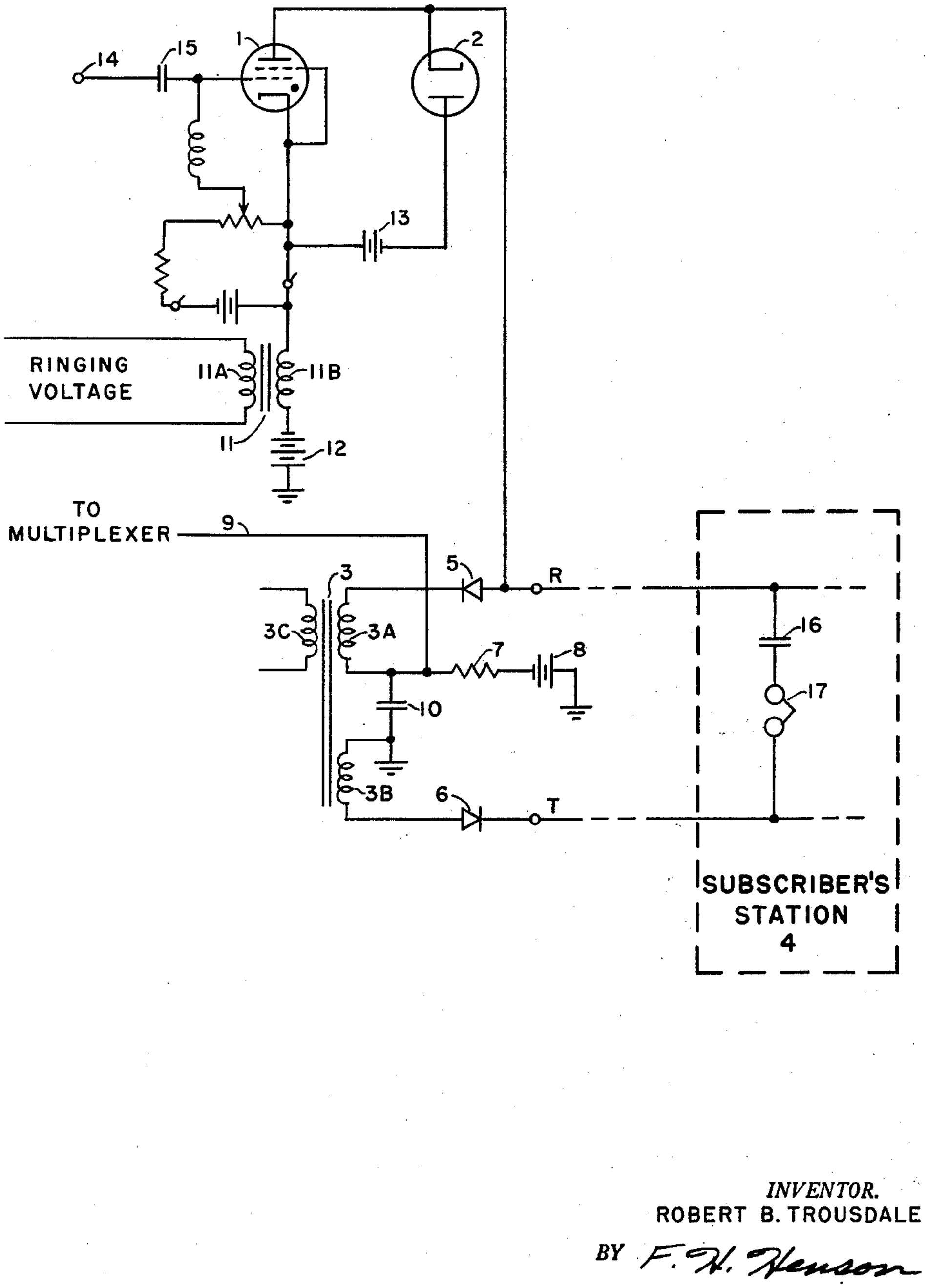
INVENTOR.
ROBERT B. TROUSDALE
BY F. H. Henson
AGENT

United States Patent Office 2,823,266

Patented Feb. 11, 1958

2,823,266

SUBSCRIBER LINE RINGING IN AN ELECTRONIC TELEPHONE SYSTEM

Robert B. Trousdale, Webster, N. Y., assignor, by mesne assignments, to General Dynamics Corporation, a corporation of Delaware Application May 10, 1955, Serial No. 507,317

5 Claims. (Cl. 179—84)

This invention relates in general to electronic telephone systems, and more particularly to the ringing of subscribers' stations in electronic telephone systems. Electronic telephone systems in which the disclosed arrangement may be employed are shown and described in my copending applications Serial No. 301,215, filed July 28, 1952, and Serial No. 492,064, filed March 4, 1955. These copending applications are assigned to the same assignee as the present invention.

In an electronic telephone system it is conventional for the subscriber's station to terminate in a transformer in the associated line circuit. Battery feed is supplied to the substation through the windings of the transformer and ringing current is isolated from the transformer and the battery feed by means of diodes, or rectifiers, in the line conductors.

As is well known in the telephone art, the ringer at the substation is connected in series with either a capacitor or a gas tube across the line. In electronic telephone systems ringing voltage, superimposed on battery potential, is applied to the lines through either thyratrons or cold cathode gas tubes. If a capacitor is used in series with the ringer, the capacitor charges to the peak voltage of the ringing supply after a few cycles of ringing, if no means for discharging the capacitor is provided, and further ringing is impossible. This is brought about because the thyratron or gas tube is essentially a unidirectional conducting device and is turned off at some point during the positive swing of the ringing voltage. Furthermore, the capacitor cannot discharge while the tube is non-conducting because of the inclusion of the diodes or rectifiers in the line conductors.

If a gas tube is used in series with the ringer, the D.-C. component of the ringing voltage flows through the ringer. It has been found that the heavy D.-C. component of the eletcronic ringing voltage, due to the superimposing voltage seriously affects the tuning and sensitivity of a conventional harmonic ringer.

Accordingly, it is the general object of this invention to provide a new and improved electronic telephone system.

It is a further object of the invention to provide a new and improved means for ringing subscribers' stations in an electronic telephone system.

It is a more particular object of the invention to provide a new and improved means for discharging the capacitor, which is connected in series with the substation ringer, when the ringing thyratron or gas tube, which applies ringing to the called line, is rendered non-conductive.

According to the present invention, the capacitor is connected in series with the ringer across the line and a diode or unidirectional conducting means is connected between the anode and cathode of the ringing thyratron and is so poled that the capacitor is discharged through the diode when the thyratron is rendered non-conductive.

Further objects and advantages of the invention will become apparent as the following description proceeds, and features of novelty which characterize the invention are set forth in particularity in the claims annexed to and forming a part of this specification.

For a better understanding of the invention, reference may be had to the accompanying drawing which shows the essential elements of a line circuit for applying ringing current to a subscriber line.

As illustrated, the line circuit comprises a speech transformer 3 which is connected by tip and ring conductors T and R, respectively, to subscriber's station 4. Although just one subscriber's station has been shown it is to be understood that there may be several parties on the same line. Battery feed is supplied to the stations on the line over a circuit extending from ground through transformer winding 3B, diode 6, over the tip conductor T, the subset transmitter and receiver (not shown), over the ring conductor R, through diode 5, transformer winding 3A, and through supervisory resistor 7 to battery 8, which may be 48 volts. The diffused junction germanium diodes 5 and 6, which may be type 1N–93, are poled so as to conduct. It is to be noted that when no party on the line is off-hook, no current flows through supervisory resistor 7, and conductor 9, which extends to the multiplexer, stands at −48 volts. When a subscriber on the line either initiates or answers a call, a loop is closed at the station and current flows through supervisory resistor 7. The potential of conductor 9 drops in accordance with the voltage drop across resistor 7 to enable the multiplexer to generate pulses in the time position of the line, as fully described in the above identified copending applications. Talking signals appear across windings 3A and 3B, are induced in secondary winding 3C, and coupled to succeeding circuits. Capacitor 10 by-passes the supervisory resistor to voice frequencies but permits dial impulses to appear across the resistor and hence on conductor 9.

When any one of the subscriber stations on the illustrated line is called, thyratron tube 1, which may be type 2D21, is utilized to connect ringing voltage of the proper frequency to conductor R. Ringing voltage of first one harmonic frequency and then another appears in sequence across primary winding 11A of transformer 11 and is induced in secondary winding 11B, superimposed on battery 12 which may be 80 volts, and applied to the cathode and shield grid of tube 1. The ringing voltage is preferably of such magnitude that the upper terminal of winding 11B swings between approximately 0 and −160 volts. Thyratron 1 does not fire, however, until triggering or operating signals, which may be at a frequency of 100 kc., for example, are connected over conductor 14 and coupled through capacitor 15 to the grid of tube 1. Triggering signals are applied to conductor 14 at the same time that the ringing frequency corresponding to the selected called station is applied to transformer 11 so that tube 1 conducts only during that interval of time. The generation and application of trigger signals is described in detail in the above identified copending applications.

When triggering signals are present, tube 1 fires during the negative excursion of the ringing voltage and ringing current is conducted through tube 1, over conductor R, through capacitor 16, ringer 17, over conductor T, through diode 6, and through transformer winding 3B to ground. Capacitor 16, which is normally charged to −48 volts, begins to charge toward approximately −148 volts as determined by the source voltage of −160 volts minus the tube drop of approximately 12 volts. The time constant of the circuit including capacitor 16 and the resistance and inductance of harmonic ringer 17 is quite long, however, so that in the absence of discharge tube 2 it would take several cycles of ringing current before capacitor 16 would be completely charged and thereafter block ringing of ringer 17.

Tube 1 is rendered non-conductive during the positive excursion of each cycle of ringing voltage when the voltage across the tube drops below the sustaining voltage of approximately 12 volts. In the absence of discharge diode 2, it can be seen that capacitor 16 would remain charged when tube 1 is rendered non-conductive since diode 5 is now poled in the reverse direction for discharging the capacitor.

Diode 2, which may be type 6X4, is included in the circuit to discharge the capacitor back to 48 volts. Bias battery 13, which may be 48 volts, is included in the circuit for reasons which will be explained more fully hereinafter. As the potential on the upper terminal of winding 11B approaches zero volts, diode 2 conducts since its anode, which is then at approximately −48 volts, is positive with respect to its cathode, which stands at the potential of the upper terminal of capacitor 16. When the capacitor 16 is discharged to 48 volts, diode 2 is rendered non-conductive and the circuit is in readiness for the next cycle of ringing voltage.

Bias battery 13 is included in the circuit to prevent the conduction of diode 2 when the line is not being rung. As previously mentioned, the ringing voltage varies between approximately 0 and −160 volts and is connected to the cathode of tube 1 at all times. It can be seen that without the bias battery, diode 2 would conduct on the portion of ringing voltage between −48 and 0 volts since its cathode stands at −48 volts through diode 5, winding 3A, resistor 7 and battery 8. This current flow would produce a voltage drop in supervisory resistor 7 and thus cause the multiplexer to falsely generate pulses in the time position of the line.

While there has been disclosed what is at present considered to be the preferred embodiment of the invention, other modifications will readily occur to those skilled in the art. For example, it will be obvious to those skilled in the art that the ringer at the substation may be connected to ground at the substation for divided line ringing rather than being returned to ground over the tip conductor T for bridged ringing. It is not therefore desired that the invention be limited to the specific arrangement shown and described and it is intended to cover in the appended claims all such modifications as fall within the true spirit and scope of the invention.

What is claimed is:

1. In a telephone system, a subscriber station including a capacitor and a ringer connected in series, a source of cyclic ringing current, an electron discharge device for connecting said source of ringing current to said series connected capacitor and ringer when conductive, said electron discharge device having an anode, a cathode, and a control electrode, means for applying an operating signal to said control electrode for rendering said electron discharge device conductive during a portion of each ringing cycle, and unidirectional conducting means connected between said anode and said cathode for discharging said capacitor during another portion of each ringing cycle.

2. In a telephone system, a line circuit, a subscriber station connected to said line circuit by line conductors, said subscriber station including a capacitor and a ringer, means for connecting said capacitor and said ringer in series between one of said line conductors and ground, a source of cyclic ringing current, an electron discharge device for connecting said source of ringing current to said one line conductor when conductive, said electron discharge device having an anode, a cathode, and a control electrode, means for applying an operating signal to said control electrode for rendering said electron discharge device conductive during a portion of each ringing cycle, and unidirectional conducting means connected between said anode and said cathode for discharging said capacitor during another portion of each ringing cycle.

3. In a telephone system, a line circuit, a subscriber station connected to said line circuit by line conductors, said subscriber station including a capacitor and a ringer, means for connecting said capacitor and said ringer in series between one of said line conductors and ground, a source of cyclic ringing current, an electron discharge device having an anode, a cathode, and a control electrode, means for connecting said source of ringing current to said cathode, said anode being connected to said one line conductor, means for applying an operating signal to said control electrode for rendering said electron discharge device conductive during a portion of each ringing cycle to thereby connect said source of ringing current to said one line conductor, and unidirectional conducting means connected between said anode and said cathode for discharging said capacitor during another portion of each ringing cycle.

4. In a telephone system, a subscriber station including a capacitor and a ringer connected in series, a source of cyclic ringing current, an electron discharge device for connecting said source of ringing current to said series connected capacitor and ringer when conductive to thereby charge said capacitor, said electron discharge device having an anode, a cathode, and a control electrode, means for applying an operating signal to said control electrode, said ringing current being of such magnitude that said electron discharge device is rendered conductive during a portion of each ringing cycle only if said operating signal is applied to said control electrode and is rendered non-conductive during a different portion of each ringing cycle even if said operating signal is applied to said control electrode, unidirectional conducting means connected between said anode and said cathode for discharging said capacitor during said different portion of each ringing cycle, and biasing means for preventing the conduction of said unidirectional conducting means during said different portion of each ringing cycle if said capacitor is not charged.

5. In a telephone system, a line circuit, a subscriber station connected to said line circuit by line conductors, said subscriber station including a capacitor and a ringer, means for connecting said capacitor and said ringer in series between one of said line conductors and ground, a source of cyclic ringing current, an electron discharge device having an anode, a cathode, and a control electrode, means for connecting said source of ringing current to said cathode, said anode being connected to said one line conductor, means for applying an operating signal to said control electrode, said ringing current being of such magnitude that said electron discharge device is rendered conductive to thereby connect said source of ringing current to said line and charge said capacitor during a portion of each ringing cycle only if said operating signal is applied to said control electrode and is rendered non-conductive during a different portion of each ringing cycle even if said operating signal is connected to said control electrode, unidirectional conducting means connected between said anode and said cathode for discharging said capacitor during said different portion of each ringing cycle, and biasing means for preventing the conduction of said unidirectional conducting means during said different portion of each ringing cycle if said capacitor is not charged.

No references cited.